(12) United States Patent
Fukudome et al.

(10) Patent No.: US 8,084,544 B2
(45) Date of Patent: Dec. 27, 2011

(54) PROCESS FOR PRODUCTION OF WATER-ABSORBING RESIN

(75) Inventors: Shinya Fukudome, Himeji (JP); Junichi Takatori, Himeji (JP); Kenya Matsuda, Himeji (JP); Yasuhiro Nawata, Himeji (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 580 days.

(21) Appl. No.: 11/922,850

(22) PCT Filed: Jun. 30, 2006

(86) PCT No.: PCT/JP2006/313047
§ 371 (c)(1),
(2), (4) Date: Dec. 26, 2007

(87) PCT Pub. No.: WO2007/004529
PCT Pub. Date: Jan. 11, 2007

(65) Prior Publication Data
US 2009/0118432 A1    May 7, 2009

(30) Foreign Application Priority Data
Jul. 4, 2005    (JP) .................................. 2005-194697

(51) Int. Cl.
*C08F 2/18* (2006.01)
*C08F 2/44* (2006.01)
*C08F 20/06* (2006.01)

(52) U.S. Cl. .......... 525/259; 525/53; 525/194; 525/221; 525/262; 525/301; 525/329.9; 525/379; 525/381; 525/382; 526/215; 526/217; 526/317.1

(58) Field of Classification Search .................. 525/259, 525/262, 301, 329.9; 526/215, 317.1
See application file for complete search history.

(56) References Cited

U.S. PATENT DOCUMENTS

| | | |
|---|---|---|
| 5,180,798 A | 1/1993 | Nakamura et al. |
| 5,548,047 A | 8/1996 | Ito et al. |
| 5,652,309 A | 7/1997 | Itoh et al. |
| 6,335,406 B1 | 1/2002 | Nagasuna et al. |
| 2005/0085604 A1 | 4/2005 | Handa et al. |
| 2007/0015887 A1 | 1/2007 | Yoshino et al. |
| 2007/0093766 A1 | 4/2007 | Yoshino et al. |
| 2008/0119808 A1 | 5/2008 | Handa et al. |

FOREIGN PATENT DOCUMENTS

| | | | |
|---|---|---|---|
| EP | 0 441 507 B1 | | 8/1991 |
| EP | 0 522 570 A1 | | 1/1993 |
| EP | 0 751 159 A2 | | 1/1997 |
| EP | 1 466 928 A1 | | 10/2004 |
| EP | 1466928 A1 | * | 10/2004 |
| EP | 1623998 A1 | | 2/2006 |
| EP | 1 813 628 A1 | | 8/2007 |
| JP | 2-255804 A | | 10/1990 |
| JP | 3-227301 A | | 10/1991 |
| JP | 5-17509 A | | 1/1993 |
| JP | 9-12613 A | | 1/1997 |
| JP | 9-124710 A | | 5/1997 |
| JP | 2000-38407 A | | 2/2000 |
| JP | 2003-206381 A | | 7/2003 |
| WO | WO-2004/101628 A1 | | 11/2004 |
| WO | WO-2004/110328 A1 | | 12/2004 |

OTHER PUBLICATIONS

Office Action mailed Feb. 6, 2009 in Chinese Application No. 2006800204598.1.
European Search Report for Application No. 06767655.1 dated Jun. 23, 2009.
Chinese Office Action issued Jul. 31, 2009 in Chinese Application No. 200680024598.1.

* cited by examiner

*Primary Examiner* — Roberto Rabago
(74) *Attorney, Agent, or Firm* — Birch, Stewart, Kolasch & Birch, LLP

(57) ABSTRACT

Process for preparing a water-absorbent resin comprising carrying out a reversed-phase suspension polymerization in multi-steps of two or more steps. The water-absorbent resin is prepared by subjecting a water-soluble ethylenically unsaturated monomer to the reversed phase suspension polymerization. This process for preparing a water-absorbent resin involves adding an aminocarboxylic acid compound to at least one step in the second and subsequent steps to carry out the polymerization reaction. The resulting water-absorbent resin can be suitably used in a hygienic material. The water-absorbent resin has a high degree of water-retention, including a high degree of water absorption under pressure. It also has a high water absorption rate, and contains only a small amount of water-soluble substances.

5 Claims, 1 Drawing Sheet

[Figure 1]
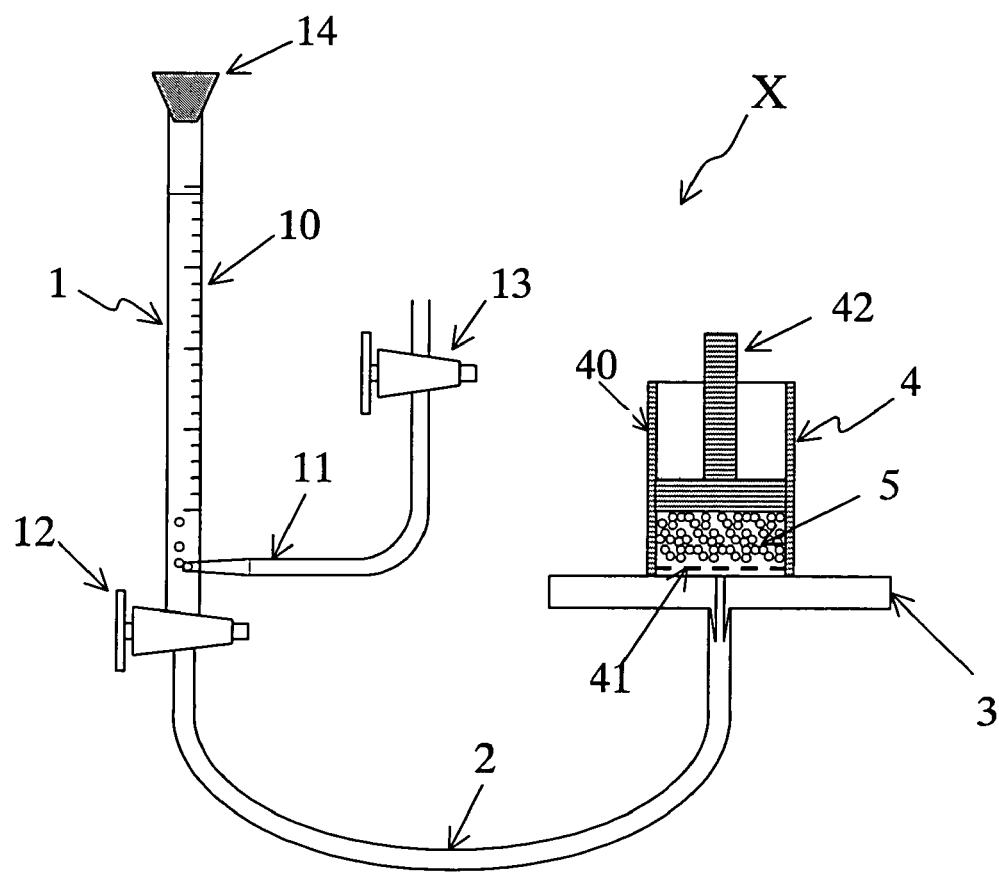

PROCESS FOR PRODUCTION OF WATER-ABSORBING RESIN

TECHNICAL FIELD

The present invention relates to a process for preparing a water-absorbent resin. More specifically, the present invention relates to a process for preparing a water-absorbent resin which can be suitably used in hygienic materials such as disposable diaper, incontinence pad and sanitary napkin, and a water-absorbent resin obtainable by the process.

BACKGROUND ART

A water-absorbent resin has been widely utilized in various fields such as hygienic materials such as disposable diaper and sanitary articles; horticultural materials such as water-retaining materials and soil improvers; and industrial and construction materials such as water blocking materials for cables and dewfall preventing materials. As the water-absorbent resins mentioned above, there have been known, for example, hydrolysates of starch-acrylonitrile graftcopolymers, neutralized products of starch-acrylate graftcopolymers, saponified products of vinyl acetate-acrylic ester copolymers, partially neutralized products of polyacrylic acid, and the like.

In recent years, an absorbent material in a hygienic material such as disposable diaper or sanitary napkin tends to be made thinner from the viewpoint of comfort upon use. When the absorbent material is thinned, the ratio of a water-absorbent resin in the absorbent material is increased, so that gel blocking of the water-absorbent resins with each other is likely to take place when a body fluid or the like is absorbed. In order to suppress the gel blocking of the water-absorbent resins with each other, it has been desired that the water-absorbent resins have a large amount of water absorption under pressure. In addition, a water-absorbent resin having a high water-absorption rate has been desired in order to prevent leakage of a body fluid or the like. Further, in order to maintain the comfort of the hygienic material upon a long-term use, a water-absorbent resin having a small amount of water-soluble substance has been desired.

In order to make the water absorption capability under pressure large, it is generally necessary to increase a crosslinking density of the water-absorbent resin, whereby the water-retention capacity of the water-absorbent resin is lowered. The absorption amount of the absorbent material using the above-mentioned water-absorbent resin is consequently lowered.

On the other hand, when a crosslinking density of the water-absorbent resin is lowered, an uncrosslinked component is increased, and upon contacting with a liquid, the water-absorbent resin is formed into lumps, whereby water absorption rate tends to be lowered, and a water-soluble substance is also likely to be eluted.

In order to solve the above problems, there have been known, a process comprising carrying out an aqueous polymerization in the presence of phosphorous acid and/or a salt thereof, to give a precursor of a water-absorbent resin, and thereafter mixing the precursor of a water-absorbent resin with a surface crosslinking agent while heating (see Patent Publication 1), and a process comprising carrying out a reversed phase suspension polymerization in the presence of a hypophosphorous acid, to give a precursor of a water-absorbent resin, and thereafter subjecting the water-absorbent resin to a surface crosslinking (see Patent Publication 2), and the like.

However, the water-absorbent resins obtained by these processes have been inferior in at least one property of water-retention capacity, water absorption capacity under pressure, water absorption rate, and the amount of water-soluble substance and have had a disadvantage that the water-absorbent resins cannot keep the properties satisfying all of the above. Therefore, a water-absorbent resin which is excellent in all of water-retention capacity, water absorption capacity under pressure, water absorption rate, and the amount of water-soluble substance is desired.

Patent Publication 1: Japanese Patent Laid-Open No. Hei 9-124710

Patent Publication 2: Japanese Patent Laid-Open No. Hei 2-255804

DISCLOSURE OF INVENTION

Problems to be Solved by the Invention

An object of the present invention is to provide a process for preparing a water-absorbent resin which can be suitably used in a hygienic material, the water-absorbent resin having a large amount of water-retention, a large amount of water absorption under pressure, a high water absorption rate, and a small amount of water-soluble substance.

Means to Solve the Problems

Specifically, the present invention relates to a process for preparing a water-absorbent resin comprising carrying out a reversed phase suspension polymerization in multi-steps of two or more steps when the water-absorbent resin is prepared by subjecting a water-soluble ethylenically unsaturated monomer to the reversed phase suspension polymerization, said process for preparing a water-absorbent resin being characterized by adding an aminocarboxylic acid compound to at least one step in the second and subsequent steps, to carry out the polymerization reaction.

EFFECTS OF THE INVENTION

According to the process of the present invention, a water-absorbent resin having a large amount of water-retention, a large amount of water absorption under pressure, a high water absorption rate, and a small amount of water-soluble substance can be obtained.

BEST MODE FOR CARRYING OUT THE INVENTION

In the process for preparing a water-absorbent resin of the present invention, first, a first-step reversed phase suspension polymerization reaction in a water-in-oil system is carried out by mixing together an aqueous solution of a water-soluble ethylenically unsaturated monomer, a surfactant and/or a polymeric protective colloid, a radical polymerization initiator, an internal crosslinking agent and a hydrocarbon-based solvent, and heating the mixture with stirring.

The water-soluble ethylenically unsaturated monomer used includes, for example, (meth)acrylic acid ("acryl-" and "methacryl-" as used herein collectively refer to "(meth)acryl-," hereinafter referred to the same), 2-(meth)acrylamide-2-methylpropanesulfonic acid and/or an alkali salt thereof; nonionic monomers such as (meth)acrylamide, N,N-dimethyl(meth)acrylamide, 2-hydroxyethyl(meth)acrylate, N-methylol(meth)acrylamide and polyethylene glycol mono(meth)acrylate; amino group-containing unsaturated monomers such as N,N-diethylaminoethyl (meth)acrylate, N,N-diethylaminopropyl(meth)acrylate, and diethylaminopropyl (meth)acrylamide or quaternary salts thereof; and the like. At least one member selected from these groups can be used. Among them, acrylic acid, methacrylic acid, or alkali salts thereof, acrylamide, methacrylamide, or N,N-dimethylacrylamide can be suitably used. In addition, a monomer component used in the second and subsequent steps may use the monomer component which is the same as or different from the monomer component used in the first step.

The water-soluble ethylenically unsaturated monomer can be usually used in the form of an aqueous solution. It is preferable that the concentration of the monomers in the aqueous solution of the monomers is preferably from 15% by mass to a saturated concentration, and more preferably in the range of from 20% by mass to a saturated concentration.

When the water-soluble ethylenically unsaturated monomer has an acid group as (meth)acrylic acid and 2-(meth) acrylamide-2-methylpropanesulfonic acid, the acid group may be neutralized with an alkaline neutralizing agent such as an alkali metal compound. The alkaline neutralizing agent as mentioned above includes aqueous solutions of sodium hydroxide, potassium hydroxide, ammonium hydroxide, and the like. These alkaline neutralizing agents may be used alone or in combination.

The degree of neutralization of all the acid groups with the alkaline neutralizing agent is preferably in the range of from 10 to 100% by mol, and more preferably in the range of from 30 to 80% by mol, from the viewpoint of increasing osmotic pressure to increase absorption capability of the resulting water-absorbent resin particles, and not causing any disadvantages in safety or the like due to the presence of an excess alkaline neutralizing agent.

The surfactant used includes, for example, sucrose fatty acid esters, polyglycerol fatty acid esters, sorbitan fatty acid esters, polyoxyethylene sorbitan fatty acid esters, polyoxyethylene glycerol fatty acid esters, sorbitol fatty acid esters, polyoxyethylene sorbitol fatty acid esters, polyoxyethylene alkyl ethers, polyoxyethylene alkylphenyl ethers, polyoxyethylene castor oil, polyoxyethylene hydrogenated castor oil, alkylallylformaldehyde condensed polyoxyethylene ethers, polyoxyethylene polyoxypropylene block copolymer, polyoxyethylene polyoxypropyl alkyl ethers, polyethylene glycol fatty acid esters, alkyl glucosides, N-alkyl glucone amides, polyoxyethylene fatty acid amides, polyoxyethylene alkylamines, phosphoric esters of polyoxyethylene alkyl ethers, and phosphoric esters of polyoxyethylene alkylallyl ethers, and the like.

Among them, sucrose fatty acid esters and polyglycerol fatty acid esters are preferable from the viewpoint of dispersion stability of the aqueous solution of the monomer. These surfactants may be used alone or in combination of two or more kinds.

The polymeric protective colloid usable in the present invention includes, for example, ethyl cellulose, ethyl hydroxyethyl cellulose, polyethylene oxide, maleic anhydride polyethylene, maleic anhydride polybutadiene, maleic anhydride EPDM (ethylene/propylene/diene terpolymer), and the like.

In addition, a polymeric dispersing agent may be used together with the above-mentioned surfactant. The polymeric dispersing agent used includes maleic anhydride-modified polyethylene, maleic anhydride-modified polypropylene, maleic anhydride-modified ethylene-propylene copolymer, maleic anhydride-modified EPDM (ethylene-propylene-diene terpolymer), maleic anhydride-modified polybutadiene, ethylene-maleic anhydride copolymer, ethylene-propylene-maleic anhydride copolymer, butadiene-maleic anhydride copolymer, oxidized polyethylene, ethylene-acrylic acid copolymer, ethyl cellulose, ethyl hydroxyethyl cellulose, and the like. Among them, maleic anhydride-modified polyethylene, maleic anhydride-modified polypropylene, maleic anhydride-modified ethylene-propylene copolymer, oxidized polyethylene, and ethylene-acrylic acid copolymer are preferable, from the viewpoint of dispersion stability of the aqueous solution of the monomer. These polymeric dispersing agents may be used alone or in combination of two or more kinds.

These dispersion stabilizers are used in an amount of from 0.1 to 5 parts by mass, and preferably from 0.2 to 3 parts by mass, based on 100 parts by mass of the aqueous solution of the monomer in the first step, in order to favorably keep dispersion state of the aqueous solution of the monomer and obtain an dispersion effect accounting to the amount used, in a petroleum-based hydrocarbon solvent.

A crosslinking agent (internal crosslinking agent) may be added as occasion demands to the above-mentioned aqueous solution of the monomer, to carry out the polymerization. As the internal crosslinking agent added to the aqueous solution of the monomer before the polymerization reaction, for example, compounds each having two or more polymerizable unsaturated groups can be used. The internal crosslinking agent includes, for example, di- or tri(meth)acrylate esters of polyols such as (poly)ethylene glycol ["polyethylene glycol" and "ethylene glycol" as used herein are collectively described as "(poly)ethylene glycol," hereinafter referred to the same], (poly)propylene glycol, trimethylolpropane, glycerol polyoxyethylene glycol, polyoxypropylene glycol, and (poly)glycerol; unsaturated polyesters obtained by reacting the above-mentioned polyol with an unsaturated acid such as maleic acid and fumaric acid; bisacrylamides such as N,N'-methylenebis(meth)acrylamide; di- or tri(meth)acrylate esters obtained by reacting a polyepoxide with (meth)acrylic acid; carbamyl esters of di(meth)acrylic acid obtained by reacting a polyisocyanate such as tolylene diisocyanate or hexamethylene diisocyanate with hydroxyethyl(meth)acrylate; allylated starch; allylated cellulose; diallyl phthalate; N,N',N"-triallyl isocyanurate; divinylbenzene; and the like.

In addition, as the internal crosslinking agent, in addition to the above-mentioned compounds each having two or more polymerizable unsaturated groups, compounds each having two or more other reactive functional groups can be used. The internal crosslinking agent includes, for example, glycidyl group-containing compounds such as (poly)ethylene glycol diglycidyl ether, (poly)propylene glycol diglycidyl ether, and (poly)glycerol diglycidyl ether; (poly)ethylene glycol; (poly)propylene glycol; (poly)glycerol; pentaerythritol; ethylenediamine; polyethyleneimine; glycidyl(meth)acrylate; and the like. These internal crosslinking agents may be used in combination of two or more kinds.

The internal crosslinking agent is added in an amount of preferably 1% by mol or less, and more preferably 0.5% by mol or less, based on the total amount of the monomer, from the viewpoint of sufficiently enhancing absorption property of the resulting water-absorbent resin particles. Here, the reason why the addition of the internal crosslinking agent is optional is that water absorption capability of the water-absorbent resin particles can be controlled also by adding a crosslinking agent for subjecting the particles to crosslinking on their surface or near their surface in any steps from after the polymerization of the monomers to drying.

The radical polymerization initiator added to the aqueous solution of the monomer includes, for example, persulfates such as potassium persulfate, ammonium persulfate, and sodium persulfate; peroxides such as methyl ethyl ketone peroxide, methyl isobutyl ketone peroxide, di-t-butyl peroxide, t-butyl cumyl peroxide, t-butyl peroxyacetate, t-butyl peroxyisobutylate, t-butyl peroxypivalate, and hydrogen peroxide; azo compounds such as 2,2'-azobis[2-(N-phenylamidino)propane]dihydrochloride, 2,2'-azobis[2-(N-allylamidino)propane]dihydrochloride, 2,2'-azobis{2-[1-(2-hydroxyethyl)-2-imidazoline-2-yl]propane}dihydrochloride, 2,2'-azobis{2-methyl-N-[1,1-bis(hydroxymethyl)-2-hydroxyethyl]propionamide}, 2,2'-azobis[2-methyl-N-(2-hydroxyethyl)-propionamide], and 4,4'-azobis(4-cyanovaleric acid); and the like. These radical polymerization initiators may be used alone or in combination of two or more kinds.

The radical polymerization initiator is usually used in an amount of from 0.005 to 1% by mol, based on the total amount of the monomer. When the amount used is less than 0.005% by mol, it is not preferable since a long time is required for the polymerization reaction. When the amount used is more than 1% by mol, it is not preferable since a drastic polymerization reaction occurs.

The above-mentioned radical polymerization initiator can be also used as a redox polymerization initiator together with a reducing agent such as sodium sulfite, sodium hydrogen sulfite, ferrous sulfate, and L-ascorbic acid.

The petroleum-based hydrocarbon solvent used as dispersion medium includes, for example, aliphatic hydrocarbons such as n-hexane, n-heptane, n-octane, and ligroin; alicyclic hydrocarbons such as cyclopentane, methylcyclopentane, cyclohexane, and methylcyclohexane; aromatic hydrocarbons such as benzene, toluene, and xylene; and the like. Among them, n-hexane, n-heptane, and cyclohexane are suitably used since these are industrially easily available, stable in quality and inexpensive. These petroleum-based hydrocarbon solvents may be used alone or can be used in admixture of two or more kinds.

The hydrocarbon-based solvent is usually contained in an amount of preferably from 50 to 600 parts by weight, and more preferably from 80 to 550 parts by weight, based on 100 parts by weight of the water-soluble ethylenically unsaturated monomer, from the viewpoint of removing heat of polymerization and making easy to control the polymerization temperature.

The reaction temperature of the polymerization reaction differs depending upon the radical polymerization initiator used. The reaction temperature is usually from 20° to 110° C., and preferably from 40° to 90° C. When the reaction temperature is lower than 20° C., the polymerization rate gets lower and the polymerization time gets longer, so that it is not economically preferable. When the reaction temperature is higher than 110° C., it would be difficult to remove heat of polymerization, so that it would be difficult to smoothly carry out the reaction.

Thus, the first-step reversed phase suspension polymerization is carried out. Next, the reaction mixture obtained by the first-step reversed phase suspension polymerization is subjected to a second- or subsequent-step reversed phase suspension polymerization. In the present invention, the reversed phase suspension polymerization is carried out in multi-steps of two or more steps, and it is preferable that the number of steps is two or three steps from the viewpoint of increasing productivity.

The greatest feature of the present invention resides in that a reversed phase suspension polymerization is carried out in the presence of an aminocarboxylic acid compound in at least one of the steps of the polymerization in the second or subsequent step. The process for carrying out a reversed phase suspension polymerization in the second or subsequent steps in the presence of an aminocarboxylic acid compound is not particularly limited. One example of the process for carrying out a second- or subsequent-step reversed phase suspension polymerization includes a process comprising adding an aqueous solution of a water-soluble ethylenically unsaturated monomer to the reaction mixture obtained in the first-step polymerization reaction with mixing, and carrying out a second- or subsequent-step reversed phase suspension polymerization in the same manner as in the first step.

At this point, the aminocarboxylic acid compound may be added to the aqueous solution of a water-soluble ethylenically unsaturated monomer which is usable for carrying out the second- or subsequent-step reversed phase suspension polymerization, or may be added to the reaction mixture obtained by a first- or subsequent-step reversed phase suspension polymerization after cooling.

The aminocarboxylic acid compound usable in the present invention includes ethylenediaminetetraacetic acid, hydroxyethylethylenediaminetriacetic acid, dihydroxyethylethylenediaminediacetic acid, 1,3-propanediaminetetraacetic acid, diethylenetriaminepentaacetic acid, triethylenetetraminehexaacetic acid, nitrilotriacetic acid, hydroxyethyliminodiacetic acid, cyclohexane-1,2-diaminetetraacetic acid, ethylenediaminetetrapropionic acid, N-alkyl-N'-carboxymethylaspartic acid, N-alkenyl-N'-carboxymethylaspartic acid, L-glutamatediacetic acid, salts thereof, and the like. The above-mentioned salts include alkali metal salts, alkaline earth metal salts, ammonium salts, amine salts, salts of transition metals, and the like. Among them, ethylenediaminetetraacetic acid, hydroxyethylethylenediaminetriacetic acid, diethylenetriaminepentaacetic acid, dihydroxyethylethylenediaminediacetic acid, triethylenetetraminehexaacetic acid, and salts thereof are preferable, and ethylenediaminetetraacetic acid tetrasodium salt, hydroxyethylethylenediaminetriacetic acid trisodium salt, diethylenetriaminepentaacetic acid pentasodium salt, dihydroxyethylethylenediaminediacetic acid disodium salt, triethylenetetraminehexaacetic acid hexasodium salt, and ethylenediaminetetraacetic acid sodium iron salt are more preferable, from the viewpoint of being industrially easily available and being easily mixable with the water-soluble ethylenically unsaturated monomer. Each of these compounds may be used alone or in admixture of two or more kinds.

The aminocarboxylic acid compound in the step of carrying out the polymerization reaction by adding the aminocarboxylic acid compound to the reaction mixture in the second- or subsequent-step reversed phase suspension polymerization is used in an amount of from 0.01 to 2.5 parts by weight, and preferably from 0.1 to 1.5 parts by weight, based on 100 parts by weight of the water-soluble ethylenically unsaturated monomer used for each step of the polymerization reaction. When the aminocarboxylic acid compound is used in an amount of less than 0.01 parts by weight, the amount added is low, so that the effect is not sufficiently exhibited, and when the amount exceeds 2.5 parts by weight, residual monomers and the amount of water-soluble substance are likely to be increased.

In the present invention, a post-crosslinking treatment is carried out by adding a post-crosslinking agent to the water-absorbent resin obtained by the above-mentioned polymerization, whereby an excellent water absorption capability under pressure can be obtained.

The post-crosslinking agent as mentioned above includes compounds each having two or more reactive functional groups. Examples thereof include diglycidyl group-containing compounds such as (poly)ethylene glycol diglycidyl ether, (poly)propylene glycol diglycidyl ether, and (poly)glycerol diglycidyl ether; (poly)glycerol (poly)glycidyl ether; (poly)ethylene glycol; (poly)propylene glycol; (poly)glycerol; pentaerythritol; ethylenediamine; polyethyleneimine; and the like. Among them, (poly)ethylene glycol diglycidyl ether, (poly)propylene glycol diglycidyl ether, and (poly)glycerol diglycidyl ether are particularly preferable. These post-crosslinking agents may be used alone or in combination of two or more kinds.

The amount of the post-crosslinking agent cannot be unconditionally determined because the amount differs depending upon the kinds of the post-crosslinking agents. Usually, it is desired that the post-crosslinking agent is contained in an amount of from 0.01 to 5 parts by weight, preferably from 0.02 to 4 parts by weight, and more preferably from 0.03 to 3 parts by weight, based on 100 parts by weight of the total amount of the water-soluble ethylenically unsaturated monomer used for the polymerization. When the post-crosslinking agent is used in an amount of less than 0.01 parts by weight, the water-absorbent resin cannot achieve a satisfactorily high crosslinking density, so that the amount of water-soluble substance is liable to be increased and water absorption capacity under pressure is liable to be lowered. In addition, when the post-crosslinking agent is used in an amount of more than 5 parts by weight, the crosslinking reaction prominently progresses, so that water-retention capacity is liable to be lowered.

The timing for adding the post-crosslinking agent to the water-absorbent resin is not particularly limited, as long as the post-crosslinking agent is added after the termination of the polymerization reaction of the monomer. The post-crosslinking agent is added to the water-absorbent resin preferably in the presence of water in the range of from 1 to 400 parts by mass, more preferably in the presence of water in the range of from 5 to 200 parts by mass, and the most preferably in the presence of water in the range of from 10 to 100 parts by mass, based on 100 parts by mass of the solid content of the water-absorbent resin. As stated above, the water content upon addition of the post-crosslinking agent is controlled, whereby the water-absorbent resin particles are more comfortably subjected to crosslinking on their surface or near their surface, so that an excellent water absorption capability under pressure can be achieved.

When the post-crosslinking agent is added to the water-absorbent resin, a hydrophilic organic solvent may be used as a solvent as occasion demands. The hydrophilic organic solvent includes, for example, lower alcohols such as methyl alcohol, ethyl alcohol, n-propyl alcohol and isopropyl alcohol; ketones such as acetone and methyl ethyl ketone; ethers such as diethyl ether, dioxane, and tetrahydrofuran; amides such as N,N-dimethylformamide; sulfoxides such as dimethyl sulfoxide; and the like. These hydrophilic organic solvents may be used alone or in combination of two or more kinds.

As mentioned above, the water-absorbent resin particles subjected to the post-crosslinking treatment after the polymerization are further dried. The final water ratio of the water-absorbent resin particles is 20% or less, and preferably from 5 to 10%. When the water ratio of the water-absorbent resin particles exceeds 20%, it is not preferable because flowability as powders gets lower.

It is desired that the water-absorbent resin obtained as mentioned above usually has a median particle size of from 100 to 600 μm, and preferably from 200 to 500 μm, from the viewpoint of preventing gel blocking by fine powders in an absorbent article and the viewpoint of preventing lumpy texture by coarse-grains and increasing flexibility of an absorbent material. The above-mentioned median particle sizes are the values determined according to the method described in Examples set forth below.

A water-retention capacity of physiological saline under no load of the water-absorbent resin can be determined according to the method described in Examples set forth below. The water-absorbent resin of the present invention usually has a water-retention capacity of physiological saline under no load of preferably 40 g/g or more, from the viewpoint of having sufficient liquid absorption property and lowering an amount of re-wet of liquid in the absorbent article.

In addition, a water absorption capacity of physiological saline under pressure of the water-absorbent resin can be determined according to the method described in Examples set forth below. A load upon determination is set at 4.14 kPa, from the viewpoint of reproducing the situation that a load is applied to an absorbent material in a case where an absorbent article is used by an infant. The water-absorbent resin particles of the present invention has a water absorption capacity of 0.9% by weight physiological saline under the pressure of a 4.14 kPa load of preferably 15 ml/g or more, and more preferably 20 ml/g or more, from the viewpoint of lowering an amount of re-wet of liquid from the absorbent material at the state under load.

The action of the aminocarboxylic acid compound in the present invention has not been yet sufficiently clarified. It is inferred that the action is related to a control of a self-crosslinking generated upon the polymerization of the water-soluble ethylenically unsaturated monomer. In other words, it is presumed that the aminocarboxylic acid compound is added, in consequence of adding the post-crosslinking agent to the water-absorbent resin of which self-crosslinking has been properly suppressed, to properly carry out a post-crosslinking, whereby gel strength can be fortified without lowering water absorption capability.

An additive such as a lubricant, a deodorizing agent or an antimicrobial agent may be further added to the water-absorbent resin of the present invention as occasion demands.

EXAMPLES

The present invention will be further specifically described hereinbelow by Examples, and the present invention is not limited only to these Examples.

Example 1

An Erlenmeyer flask having a volume of 1 liter was charged with 92 g of an 80% by weight aqueous solution of acrylic acid, and 146 g of a 21% by weight aqueous sodium hydroxide was added dropwise thereto with ice-cooling from external to neutralize 75% by mol of acrylic acid, to give a 38% by weight aqueous solution of acrylic acid-partially neutralized salt. To the resulting aqueous solution of acrylic acid-partially neutralized salt were added 9.2 mg of N,N'-methylenebisacrylamide as an internal crosslinking agent and 92 mg of potassium persulfate as a polymerization initiator, and the mixture was used as an aqueous monomer solution for a first-step polymerization.

A five-necked cylindrical round bottomed flask having a volume of 2 liters, equipped with a stirrer, a two-step paddle blade, a reflux condenser, a dropping funnel and a nitrogen gas inlet tube was charged with 321 g of n-heptane, and 0.92 g of a sucrose fatty acid ester (manufactured by Mitsubishi-Kagaku Foods Corporation under the trade name of S-370) was added thereto to dissolve. Thereafter, the entire amount of the aqueous monomer solution for the first-step polymerization prepared as mentioned above was added thereto, and the mixture was suspended with stirring. The internal of the system was replaced with nitrogen gas. Subsequently, the temperature was raised to 70° C., and the first-step reversed phase suspension polymerization was carried out while keeping the temperature at 70° C. for 1 hour.

Separately from the above, an Erlenmeyer flask having a volume of 1 liter was charged with 128 g of an 80% by weight aqueous solution of acrylic acid, and 158 g of a 27% by weight aqueous sodium hydroxide was added dropwise thereto with ice-cooling to neutralize 75% by mol of acrylic acid, to give a 44% by weight aqueous solution of acrylic acid-partially neutralized salt. To the resulting aqueous solution of acrylic acid-partially neutralized salt were added 0.13 g of potassium persulfate as a polymerization initiator and 1.0 g of ethylenediaminetetraacetic acid-tetrasodium salt (manufactured by Nagase ChemteX Corporation under the trade name of CLEWAT T), and the mixture was used as an aqueous monomer solution for a second-step polymerization.

After the termination of the first-step reversed phase suspension polymerization, the reaction solution was cooled, and the entire amount of the aqueous monomer solution for a second-step polymerization prepared as mentioned above was added dropwise thereto. Thereafter, the mixture was stirred for 30 minutes, and at the same time the internal of the system was sufficiently replaced with nitrogen gas. Thereafter, the temperature of the reaction solution was raised to 70° C., and the second-step reversed phase suspension polymerization was carried out while keeping the temperature at 70° C. for 2 hours. After the termination of the polymerization, the polymerized mixture was subjected to azeotropic distillation to remove 260 g of water, to give a gelated product. The amount 0.17 g of ethylene glycol diglycidyl ether was added to the resulting gelated product while mixing, and a post-crosslinking treatment was carried out. Water and n-heptane were further distilled off from the mixture, to give 230 g of a water-absorbent resin having a median particle size of 349 μm.

Example 2

The same procedures as in Example 1 were carried out except that 1.0 g of ethylenediaminetetraacetic acid tetrasodium salt (manufactured by Nagase ChemteX Corporation under the trade name of CLEWAT T) in Example 1 was changed to 0.51 g of diethylenetriaminepentaacetic acid pentasodium salt (manufactured by Nagase ChemteX Corporation under the trade name of CLEWAT DP80), to give 229 g of a water-absorbent resin having a median particle size of 352 μm.

Example 3

The same procedures as in Example 1 were carried out except that 1.0 g of ethylenediaminetetraacetic acid tetrasodium salt (manufactured by Nagase ChemteX Corporation under the trade name of CLEWAT T) in Example 1 was changed to 1.3 g of hydroxyethylethylenediaminetriacetic acid trisodium salt (manufactured by Nagase ChemteX Corporation under the trade name of CLEWAT OH300), to give 232 g of a water-absorbent resin having a median particle size of 357 μm.

Example 4

The same procedures as in Example 1 were carried out except that 1.0 g of ethylenediaminetetraacetic acid tetrasodium salt (manufactured by Nagase ChemteX Corporation under the trade name of CLEWAT T) in Example 1 was changed to 1.5 g of dihydroxyethylethylenediaminediacetic acid disodium salt (manufactured by Nagase ChemteX Corporation under the trade name of CLEWAT WOH), to give 228 g of a water-absorbent resin having a median particle size of 359 μm.

Example 5

The same procedures as in Example 1 were carried out except that 1.0 g of ethylenediaminetetraacetic acid tetrasodium salt (manufactured by Nagase ChemteX Corporation under the trade name of CLEWAT T) in Example 1 was changed to 0.38 g of triethylenetetraminehexaacetic acid hexasodium salt (manufactured by Nagase ChemteX Corporation under the trade name of CLEWAT TH), to give 230 g of a water-absorbent resin having a median particle size of 348 μm.

Example 6

The same procedures as in Example 1 were carried out except that 1.0 g of ethylenediaminetetraacetic acid tetrasodium salt (manufactured by Nagase ChemteX Corporation under the trade name of CLEWAT T) in Example 1 was changed to 0.26 g of diethylenetriaminepentaacetic acid pentasodium salt (manufactured by Nagase ChemteX Corporation under the trade name of CLEWAT DP80), to give 227 g of a water-absorbent resin having a median particle size of 347 μm.

Comparative Example 1

The same procedures as in Example 1 were carried out except that ethylenediaminetetraacetic acid tetrasodium salt (manufactured by Nagase ChemteX Corporation under the trade name of CLEWAT T) in Example 1 was not added thereto, to give 230 g of a water-absorbent resin having a median particle size of 350 μm.

Comparative Example 2

An Erlenmeyer flask having a volume of 1 liter was charged with 92 g of an 80% by weight aqueous solution of acrylic acid, and 146 g of a 21% by weight aqueous sodium hydroxide was added dropwise thereto with ice-cooling from external to neutralize 75% by mol of acrylic acid, to give a 38% by weight aqueous solution of acrylic acid-partially neutralized salt. To the resulting aqueous solution of acrylic acid-partially neutralized salt were added 9.2 mg of N,N'-methylenebisacrylamide as an internal crosslinking agent, 92 mg of potassium persulfate as a polymerization initiator, and 0.92 g of ethylenediaminetetraacetic acid tetrasodium salt (manufactured by Nagase ChemteX Corporation under the trade name of CLEWAT T), and the mixture was used as an aqueous monomer solution for a first-step polymerization.

A five-necked cylindrical round bottomed flask having a volume of 2 liters, equipped with a stirrer, a two-step paddle blade, a reflux condenser, a dropping funnel and a nitrogen gas inlet tube was charged with 321 g of n-heptane, and 0.92 g of a sucrose fatty acid ester (manufactured by Mitsubishi-Kagaku Foods Corporation under the trade name of S-370) was added thereto to dissolve. Thereafter, the entire amount of the aqueous monomer solution for the first-step polymerization prepared as mentioned above was added thereto, and the mixture was suspended with stirring. The internal of the system was replaced with nitrogen gas. Subsequently, the temperature was raised to 70° C., and the first-step reversed phase suspension polymerization was carried out while keeping the temperature at 70° C. for 1 hour.

Separately from the above, an Erlenmeyer flask having a volume of 1 liter was charged with 128 g of an 80% by weight aqueous solution of acrylic acid, and 158 g of a 27% by weight aqueous sodium hydroxide was added dropwise thereto with ice-cooling to neutralize 75% by mol of acrylic acid, to give a 44% by weight aqueous solution of acrylic acid-partially neutralized salt. To the resulting aqueous solution of acrylic acid-partially neutralized salt was added 0.13 g of potassium persulfate as a polymerization initiator, and the mixture was used as an aqueous monomer solution for a second-step polymerization.

After the termination of the first-step reversed phase suspension polymerization, the reaction solution was cooled, and the entire amount of the aqueous monomer solution for a second-step polymerization prepared as mentioned above was added dropwise thereto. Thereafter, the mixture was stirred for 30 minutes, and at the same time the internal of the system was sufficiently replaced with nitrogen gas. Thereafter, the temperature of the reaction solution was raised to 70° C., and the second-step reversed phase suspension polymerization was carried out while keeping the temperature at 70° C. for 2 hours. After the termination of the polymerization, the polymerized mixture was subjected to azeotropic distillation to remove 260 g of water, to give a gelated product. The amount 0.17 g of ethylene glycol diglycidyl ether was added to the resulting gelated product while mixing, and a post-crosslinking treatment was carried out. Water and n-heptane were further distilled off from the mixture, to give 230 g of a water-absorbent resin having a median particle size of 354 μm.

Comparative Example 3

An Erlenmeyer flask having a volume of 1 liter was charged with 92 g of an 80% by weight aqueous solution of acrylic acid, and 146 g of a 21% by weight aqueous sodium hydroxide was added dropwise thereto with ice-cooling from external to neutralize 75% by mol of acrylic acid, to give a 38% by weight aqueous solution of acrylic acid-partially neutralized salt. To the resulting aqueous solution of acrylic acid-partially neutralized salt were added 9.2 mg of N,N'-methylenebisacrylamide as an internal crosslinking agent and 92 mg of potassium persulfate as a polymerization initiator, and the mixture was used as an aqueous monomer solution for a first-step polymerization.

A five-necked cylindrical round bottomed flask having a volume of 2 liters, equipped with a stirrer, a two-step paddle blade, a reflux condenser, a dropping funnel and a nitrogen gas inlet tube was charged with 321 g of n-heptane, and 0.92 g of a sucrose fatty acid ester (manufactured by Mitsubishi-Kagaku Foods Corporation under the trade name of S-370) was added thereto to dissolve. Thereafter, the entire amount of the aqueous monomer solution for the first-step polymerization prepared as mentioned above was added thereto, and the mixture was suspended with stirring. The internal of the system was replaced with nitrogen gas. Subsequently, the temperature was raised to 70° C., and the first-step reversed phase suspension polymerization was carried out while keeping the temperature at 70° C. for 1 hour.

Separately from the above, an Erlenmeyer flask having a volume of 1 liter was charged with 128 g of an 80% by weight aqueous solution of acrylic acid, and 158 g of a 27% by weight aqueous sodium hydroxide was added dropwise thereto with ice-cooling to neutralize 75% by mol of acrylic acid, to give a 44% by weight aqueous solution of acrylic acid-partially neutralized salt. To the resulting aqueous solution of acrylic acid-partially neutralized salt was added 0.13 g of potassium persulfate as a polymerization initiator, and the mixture was used as an aqueous monomer solution for a second-step polymerization.

After the termination of the first-step reversed phase suspension polymerization, the reaction solution was cooled, and the entire amount of the aqueous monomer solution for a second-step polymerization prepared as mentioned above was added dropwise thereto. Thereafter, the mixture was stirred for 30 minutes, and at the same time the internal of the system was sufficiently replaced with nitrogen gas. Thereafter, the temperature of the reaction solution was raised to 70° C., and the second-step reversed phase suspension polymerization was carried out while keeping the temperature at 70° C. for 2 hours. After the termination of the polymerization, 0.74 g of ethylenediaminetetraacetic acid tetrasodium salt (manufactured by Nagase ChemteX Corporation under the trade name of CLEWAT T) was added to a water-containing gelated slurry. Thereafter, the polymerized mixture was subjected to azeotropic distillation to remove 260 g of water, to give a gelated product. The amount 0.17 g of ethylene glycol diglycidyl ether was added to the resulting gelated product while mixing, and a post-crosslinking treatment was carried out. Water and n-heptane were further distilled off from the mixture, to give 230 g of a water-absorbent resin having a median particle size of 365 μm.

The water-absorbent resin obtained in each Example and Comparative Example was evaluated in accordance with the following methods. The evaluation results for the following items (1) to (4) are shown in Table 1.

(1) Water-Retention Capacity of Physiological Saline

The amount 2.0 g of a water-absorbent resin was weighed in a cotton bag (Cottonbroad No. 60, width 100 mm×length 200 mm), and placed in a 500 mL-beaker. Physiological saline was poured into the cotton bag in an amount of 500 g at one time, and the saline was dispersed so as not to generate an unswollen lump of the water-absorbent resin. The upper part of the cotton bag was tied up with a rubber band, and the cotton bag was allowed to stand for 1 hour, to sufficiently swell the water-absorbent resin particles. The cotton bag was dehydrated for 1 minute with a dehydrator (manufactured by Kokusan Enshinki Co., Ltd., product number: H-122) set to have a centrifugal force of 167G, and the mass Wa (g) of the cotton bag containing swelled gels after the dehydration was determined. The same procedures were carried out without adding water-absorbent resin, and the empty mass Wb (g) of the cotton bag upon wetting was determined. The water-retention capacity was obtained by the following formula:

Water-Retention Capacity of Physiological Saline (g/g)=[Wa−Wb] (g)/Mass of Water-Absorbent Resin (g).

(2) Water Absorption Capacity of Physiological Saline Under Pressure

The water absorption capacity of physiological saline of a water-absorbent resin under the pressure of 4.14 kPa was determined using a measuring apparatus X of which outline of the constitution is shown in FIG. 1.

The measuring apparatus X shown in FIG. 1 comprises a buret section 1, a lead tube 2, a measuring board 3, and a measuring section 4 placed on the measuring board 3. To the buret section 1 are connected a rubber plug 14 on the top of a buret 10, and an air introduction tube 11 and a cock 12 at the bottom portion of a buret 10, and further, a cock 13 is attached to the upper portion of the air introduction tube 11. The lead tube 2 is attached from the buret section 1 to the measuring board 3. The lead tube 2 has a diameter of 6 mm. A hole of a diameter of 2 mm is made at the central section of the measuring section 3, and the lead tube 2 is connected thereto. The measuring section 4 has a cylinder 40, a nylon mesh 41 adhered to the bottom part of the cylinder 40, and a weight 42. The cylinder 40 has an inner diameter of 2.0 cm. The nylon mesh 41 is formed to have a size of 200 mesh screen (size of opening: 75 μm), and a given amount of a water-absorbent resin 5 is evenly spread over the nylon mesh 41. The weight 42 has a diameter of 1.9 cm and a weight of 119.5 g. The weight 42 is placed on the water-absorbent resin 5, so that a 4.14 kPa load can be evenly applied to the water-absorbent resin 5.

In the measuring apparatus X having the constitution as described above, first, the cock 12 and the cock 13 at the buret section 1 are closed, and 0.9% by weight physiological saline adjusted to 25° C. is poured from the top of the buret 10 and the top of the buret is plugged with the rubber plug 14. Thereafter, the cock 12 and the cock 13 at the buret section 1 are opened. Next, the height of the measuring board 3 is adjusted so that the end of the lead tube 2 in the central section of the measuring board 3 and an air introduction port of the air introduction tube 11 are at the same height.

On the other hand, 0.10 g of the water-absorbent resin 5 is evenly spread over the nylon mesh 41 in the cylinder 40, and the weight 42 is placed on the water-absorbent resin 5. The measuring section 4 is placed so that its central section is in alignment with a lead tube port in the central section of the measuring board 3.

The volume reduction of the physiological saline in the buret 10, i.e., the volume of the physiological saline absorbed by the water-absorbent resin 5, Wc (mL), is continuously read off from a time point where the water-absorbent resin 5 started absorbing water. Water absorption capacity of physiological saline of the water-absorbent resin 5 under pressure after 60 minutes passed from the beginning of the water absorption was obtained by the following formula:

Water Absorption Capacity Under Pressure (mL/g)
=Wc (mL)/0.10 (g).

(3) Water Absorption Rate

The amount 50±0.01 g of physiological saline adjusted to 25° C. was weighed out in a 100 mL-beaker. A magnetic stirrer bar having a size of 8 mm φ×30 mm without a ring was placed in the beaker, and the beaker was placed on the top of MAGNETIC STIRRER (manufactured by IUCHI under the product number of HS-30D). Subsequently, the magnetic stirrer bar was adjusted so that the magnetic stirrer bar rotated at 600 rpm, and further adjusted so that the bottom of the vortex generated by the rotation of the magnetic stirrer bar came near the upper portion of the magnetic stirrer bar.

Next, 2.0±0.002 g of water-absorbent resin particles obtained by sieving the water-absorbent resins with two kinds of standard sieve complying with JIS-Z8801-1982 (openings of sieves: 500 μm and 300 μm), and subjecting the sieved water-absorbent resins to a particle size adjustment (500 μm or less and 300 μm or more) were quickly poured between the center of vortex in the beaker and the side of the beaker, and the time (seconds) from a point where the water-absorbent resin was poured into the beaker to a point where the vortex converged was determined with a stopwatch, which is defined as a water absorption rate.

(4) Amount of Water-Soluble Substance

The amount 500±0.1 g of physiological saline was weighed out in a 500 mL-beaker. A magnetic stirrer bar having a size of 8 mm φ×30 mm without a ring was placed in the beaker, and the beaker was placed on the top of MAGNETIC STIRRER (manufactured by IUCHI under the product number of HS-30D). Subsequently, the magnetic stirrer bar was adjusted so that the magnetic stirrer bar rotated at 600 rpm, and further adjusted so that the bottom of the vortex generated by the rotation of the magnetic stirrer bar came near the upper portion of the magnetic stirrer bar.

Next, 2.0±0.002 g of water-absorbent resin particles obtained by sieving the water-absorbent resins with two kinds of standard sieve complying with JIS-Z8801-1982 (openings of sieves: 500 μm and 300 μm), and subjecting the sieved water-absorbent resins to a particle size adjustment (500 μm or less and 300 μm or more) were quickly poured between the center of vortex in the beaker and the side of the beaker and dispersed therein, and the mixture was stirred for 3 hours. The aqueous dispersion of the water-absorbent resin after stirring for 3 hours was filtered with a standard sieve (opening of sieve: 75 μm), and the resulting filtrate was further subjected to suction filtration using a Kiriyama type funnel (Filter Paper No. 6).

The amount 80±0.1 g of the resulting filtrate was weighed out in a 100 mL-beaker dried beforehand to a constant weight, and the filtrate was dried with a forced convection oven (manufactured by ADVANTEC) at 140° C. until a constant weight is attained. A weight Wd (g) of the solid content of the filtrate was determined.

On the other hand, the same procedures as the above were carried out without using the water-absorbent resins, and a weight We (g) of the solid content of the filtrate was determined. The amount of water-soluble substance was calculated on the basis of the following formula.

Amount of Water-Soluble Substance (% by weight)=
[[(Wd−We)×(500/80)]/2]×100

(5) Median Particle Size

To 100 g of the water-absorbent resin particles was mixed 0.5 g of an amorphous silica (manufactured by Degussa Japan Co., Ltd., Sipernat 200) as a lubricant.

JIS standard sieves, a sieve having an opening of 850 μm, a sieve having an opening of 600 μm, a sieve having an opening of 425 μm, a sieve having an opening of 300 μm, a sieve having an opening of 150 μm, a sieve having an opening of 75 μm, and a receiving tray were combined in order from the top. About 100 g of the water-absorbent resin was placed on an uppermost sieve, and shaken for 20 minutes with a rotating and tapping shaker machine.

Next, the relationships between the opening of the sieve and an integral of a weight percentage remaining on the sieve were plotted on a logarithmic probability paper by calculating the weight of the water-absorbent resin particles remaining on each sieve as a weight percentage to an entire amount, and accumulating the weight percentages in order, starting from those having larger particle sizes. A particle size corresponding to a 50% by weight cumulative weight percentage was defined as a median particle size by joining the plots on the logarithmic probability paper in a straight line.

TABLE 1

|  | Water-Retention Capacity (g/g) | Water Absorption Capacity Under Pressure (ml/g) | Water Absorption Rate (second) | Amount of Water-Soluble Substance (%) |
| --- | --- | --- | --- | --- |
| Ex. 1 | 41 | 26 | 46 | 13 |
| Ex. 2 | 42 | 23 | 43 | 14 |
| Ex. 3 | 42 | 23 | 41 | 12 |
| Ex. 4 | 41 | 23 | 44 | 13 |

TABLE 1-continued

|  | Water-Retention Capacity (g/g) | Water Absorption Capacity Under Pressure (ml/g) | Water Absorption Rate (second) | Amount of Water-Soluble Substance (%) |
|---|---|---|---|---|
| Ex. 5 | 42 | 23 | 46 | 15 |
| Ex. 6 | 41 | 20 | 45 | 11 |
| Comp. Ex. 1 | 40 | 12 | 45 | 15 |
| Comp. Ex. 2 | 40 | 14 | 65 | 21 |
| Comp. Ex. 3 | 40 | 12 | 45 | 15 |

It can be seen from the results shown in Table 1 that the water-absorbent resin obtained in each Example has a large amount of water-retention of physiological saline, a large amount of water absorption of physiological saline under pressure, a high water absorption rate, and a small amount of water-soluble substance.

INDUSTRIAL APPLICABILITY

The water-absorbent resin obtained by the process for preparing a water-absorbent resin of the present invention can be suitably used in, for example, hygienic materials such as disposable diaper, incontinence pad and sanitary napkin, especially in disposable diaper.

BRIEF DESCRIPTION OF THE DRAWINGS

[FIG. 1] A schematic view showing an outline of the constitution of an apparatus for determining the water absorption capacity under pressure.

EXPLANATION OF NUMERICAL SYMBOLS

| X | measuring apparatus |
| 1 | buret section |
| 10 | buret |
| 11 | air introduction tube |
| 12 | cock |
| 13 | cock |
| 14 | rubber plug |
| 2 | lead tube |
| 3 | measuring board |
| 4 | measuring section |
| 40 | cylinder |
| 41 | nylon mesh |
| 42 | weight |
| 5 | water-absorbent resin |

The invention claimed is:

1. A process for preparing a water-absorbent resin having a water-retention capacity of 0.9% by weight physiological saline of 40 g/g or more and a water absorption capacity of 0.9% by weight physiological saline under a pressure of a 4.14 kPa load of 15 ml/g or more, said process comprising
carrying out a reversed phase suspension polymerization in multi-steps of two or more steps of subjecting a water-soluble ethylenically unsaturated monomer to the reversed phase suspension polymerization to prepare the water-absorbent resin,
wherein an aminocarboxylic acid compound is added to at least one step in the second and subsequent steps to carry out the polymerization reaction to control self-crosslinking generated upon polymerization of the water-soluble ethylenically unsaturated monomer, whereby gel strength is fortified without lowering water absorption capability.

2. The process for preparing a water-absorbent resin according to claim 1, wherein the aminocarboxylic acid compound is at least one member selected from the group consisting of ethylenediaminetetraacetic acid, hydroxyethylethylenediaminetriacetic acid, diethylenetriaminepentaacetic acid, dihydroxyethylethylenediaminediacetic acid, triethylenetetraminehexaacetic acid, and salts thereof.

3. The process for preparing a water-absorbent resin according to claim 1, wherein the aminocarboxylic acid compound is used in an amount of from 0.01 to 2.5 parts by weight, based on 100 parts by weight of the water-soluble ethylenically unsaturated monomer used for the polymerization reaction in the step of carrying out the polymerization reaction by adding the aminocarboxylic acid compound.

4. The process for preparing a water-absorbent resin according to claim 1, wherein a crosslinking agent is added to a reaction mixture after the polymerization, to carry out a post-crosslinking.

5. The process for preparing a water-absorbent resin according to claim 2, wherein the aminocarboxylic acid compound is used in an amount of from 0.01 to 2.5 parts by weight, based on 100 parts by weight of the water-soluble ethylenically unsaturated monomer used for the polymerization reaction in the step of carrying out the polymerization reaction by adding the aminocarboxylic acid compound.

* * * * *